Figure 1:
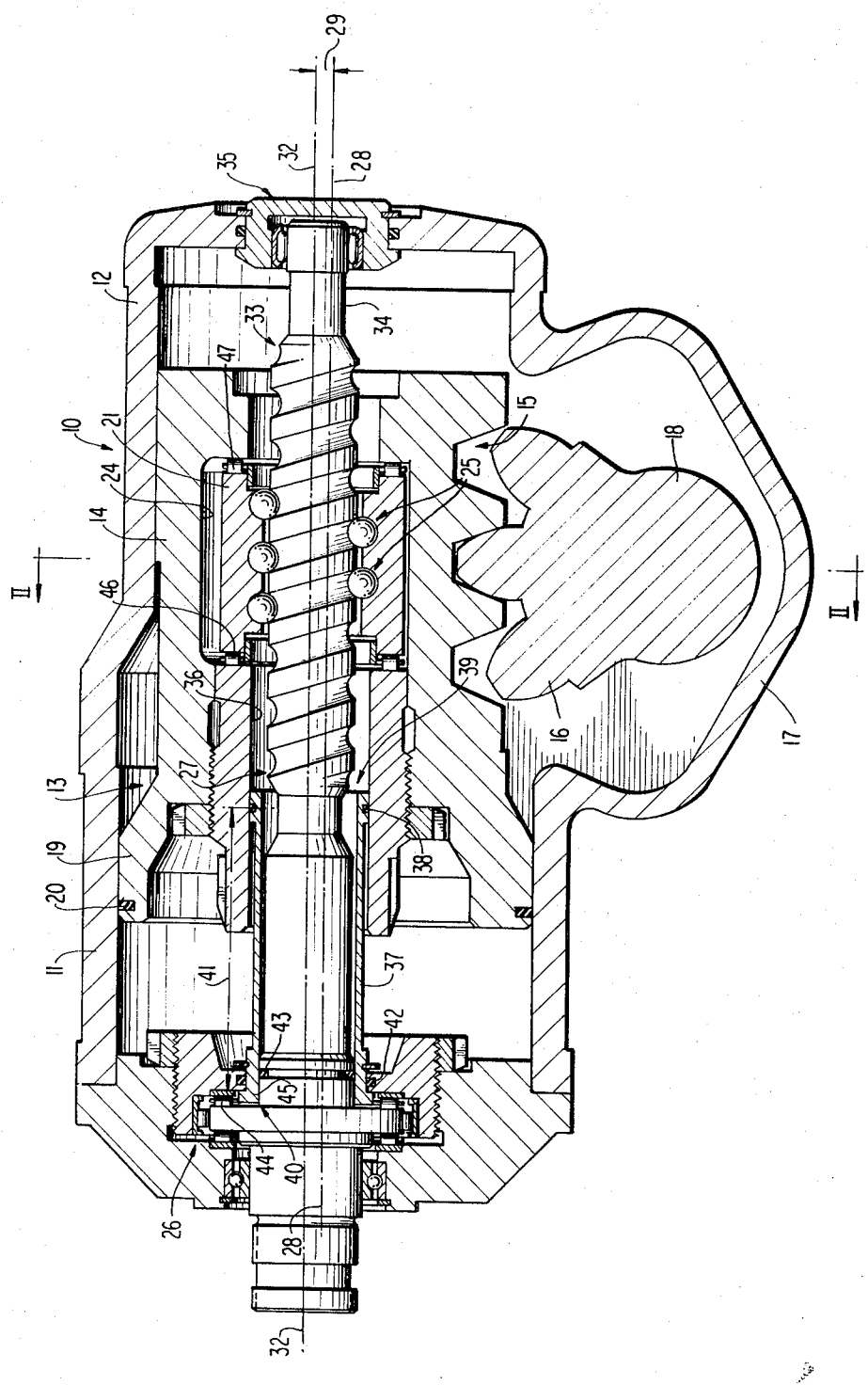

United States Patent [19]

Forster et al.

[11] 3,757,602
[45] Sept. 11, 1973

[54] SERVO STEERING FOR VEHICLES

[75] Inventors: Hans-Joachim M. Forster; Klaus Katz; Reinhold Abt, all of Stuttgart, Germany

[73] Assignee: Daimler-Benz Aktiengesellschaft, Stuttgart-Unterturkheim, Germany

[22] Filed: Dec. 3, 1971

[21] Appl. No.: 204,649

[30] Foreign Application Priority Data
Dec. 5, 1970  Germany.................. P 20 60 021.9

[52] U.S. Cl. ............................................... 74/499
[51] Int. Cl. ............................................. B62d 3/08
[58] Field of Search..................... 74/498, 499, 500, 74/497; 92/136; 91/380, 466

[56] References Cited
UNITED STATES PATENTS
3,476,203  11/1969  Forster et al. .................... 91/380 X

*Primary Examiner*—Milton Kaufman
*Attorney*—Craig, Antonelli & Hill

[57] ABSTRACT

A servo-steering mechanism for vehicles, in which the steering worm is connected with the working piston to convert the rotary movement of the worm into axial movement of the piston to provide a drive connection for the steering shaft; the steering worm is thereby eccentrically supported in the working piston.

16 Claims, 2 Drawing Figures

SERVO STEERING FOR VEHICLES

The present invention relates to a servo-steering system for vehicles, in which the steering worm is spirally movably connected with the working piston in direct engagement with the steering shaft for the drive connection thereof. The aim underlying the present invention essentially consists in so improving such a servo-steering system that within the area of the place of engagement between working piston and steering shaft sufficient piston cross sections are still realized also for the higher stresses occurring in commercial-type vehicles such as trucks.

The underlying problems are solved according to the present invention in that the steering worm is supported eccentrically in the working piston. The steering worm axis is thereby displaced toward the side opposite the steering shaft with respect to the piston axis so that a particularly strong piston wall is formed into which, for example, a toothed rack profile for the engagement with the steering shaft can be machined. The present invention is applicable particularly advantageously to such servo-steering systems in which, within the area of the steering shaft engagement a piston recess or aperture is provided at the working piston for the insertion and installation of a steering nut. This piston recess or aperture naturally weakens the piston wall available for the steering shaft engagement. Furthermore, the advantage is achieved by the present invention that also a compact servo-steering mechanism designed for trucks, in which the steering shaft is supported in the narrow cylinder portion of a steering gear housing offset in diameter and constructed as pressure medium cylinder and in which the center axis of the steering nut perpendicular to the axis of rotation in the center position of the steering shaft is disposed together with the steering shaft axis approximately in one plane, can be applied to commercial types of vehicles, especially trucks.

With such a servo-steering system, the piston wall for the steering shaft engagement is disposed in the narrow cylinder section and therefore possesses only a relatively small wall thickness with a concentric support of the steering worm. Owing to the eccentric support of the steering worm in accordance with the present invention, this critical wall strength and thickness is advantageously increased.

In order to enable a certain adjusting rotary movement for the working piston during its adjustment and thereby eliminate any possible wedging or jamming effects caused by the eccentric steering worm support, provision is made according to a further feature of the servo-steering system according to the present invention that the inner steering worm end extends through the working piston and is supported eccentrically in the steering gear housing.

According to an independent inventive concept, which may also be realized with servo-steering systems not falling within the general type of the present invention, it is additionally proposed that the steering worm extends through a concentric sealing sleeve, and that the axially outer sleeve end is supported at the steering gear housing and the axially inner sleeve end is provided with an annular seal cooperating with a cylindrical sealing surface at the working piston. The particular advantage of this seal according to the present invention essentially consists in that the seal arranged at the inner sleeve end is seated on a pivotal lever formed by the sleeve and as a result thereof possesses a certain adjusting possibility with respect to the working piston. This adjusting capability of the seal is particularly advantageous with the eccentric arrangement of the steering worm and therewith also of the sealing bushing or sleeve with respect to the working piston.

Accordingly, it is an object of the present invention to provide a servo-steering system for vehicles which avoids by simple means the aforementioned shortcomings and drawbacks encountered in the prior art.

Another object of the present invention resides in a servo-steering system for vehicles in which adquate piston cross sections are available to satisfy also the higher load and stress requirements that occur in the use with truck-type vehicles.

A further object of the present invention resides in a servo-steering system for commercial types of vehicles in which a particularly strong piston wall is formed within the endangered area subjected to high stresses.

Still a further object of the present invention resides in a servo-steering mechanism for vehicles which can be used with commercial-type vehicles, such as trucks, yet is of particularly compact construction.

Another object of the present invention resides in a servo-steering mechanism for vehicles in which not only critical wall thicknesses are advantageously increased but also any jamming effects due to eccentric bearing supports of the parts are effectively eliminated.

Still another object of the present invention resides in a servo-steering system of the type described above in which a seal is provided for the steering worm which permits a certain adjustability with respect to the working piston.

Figure 2:
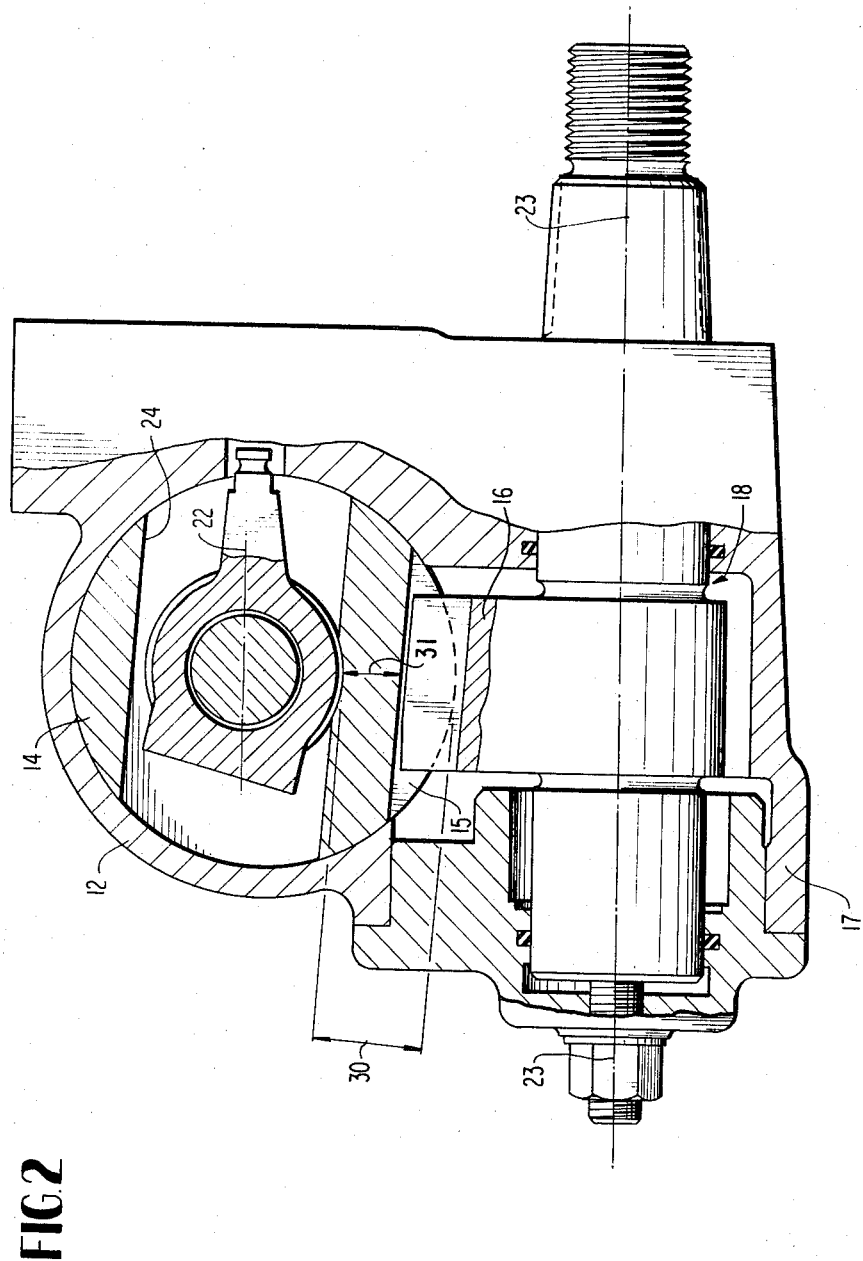

These and other objects, features and advantages of the present invention will become more apparent from the following description when taken in connection with the accompanying drawing which shows, for purposes of illustration only, one embodiment in accordance with the present invention, and wherein:

FIG. 1 is an axial cross-sectional view through a servo-steering mechanism according to the present invention with an offset steering gear housing; and FIG. 2 is a cross-sectional view taken along line II—II of FIG. 1.

Referring to the drawing wherein like reference numerals are used throughout the two views to designate like parts, the steering gear housing generally designated by reference numeral 10 which is constructed as a pressure medium cylinder, is subdivided into a wide cylinder section 11 and into a narrow cylinder section 12. The working piston generally designated by reference numeral 13 is provided with a guide shank 14 that slides within the narrow cylinder section 12 and includes a toothed rack profile 15, into which engages a toothed segment 16 of a steering shaft 18 supported in a housing bulge 17 of the narrow cylinder section 12. The piston skirt 19 of the working piston 13, which is enlarged in diameter with respect to the guide shank 14 slides within the wide cylinder section 11 and is sealed with respect to the latter by an annular seal 20 (FIG. 1). A compact housing results from the described diameter offset or stepping, whose structural length can be kept short in that the center axis 22 (FIG. 2) perpendicular to the axis of rotation- of the steering nut 21 which is rotatably and axially non-displaceably supported in the guide shank 14, is disposed together with the axis 23 of the steering shaft 18 approximately in one and the same plane (II—II in FIG. 1) (in the center position of the steering shaft). It necessarily follows from this arrangement that the aperture 24, perpendicular to the axis of rotation within the guide shank 14 for the insertion of the steering nut 21 is disposed together with the toothed rack profile 15 within the same piston area.

According to the present invention, the steering worm generally designated by reference numeral 27 which is spirally movably connected with the steering nut 21 by way of a conventional ball circulation 25 and which is supported in the wide cylinder section 11 by means of a bearing arrangement 26 serving for the rotatable support as well as for the axial fixing thereof, is eccentrically supported in relation to the longitudinal axis 32 thereof by the distance 29 with respect to the piston or cylinder axis 28. As a result thereof, the wall thickness 30 of the piston (FIG. 2) becomes relatively large notwithstanding the aperture 24 so that the toothed rack profile 15, especially the cross section 31 (FIG. 2)— is also able to withstand high stresses and loads.

The inner steering worm end 33 terminates in a bearing pin 34 which is also eccentrically supported in the narrow cylinder section 12 with respect to the cylinder axis 28 by means of a roller bearing 35. This steering worm bearing support is more favorable for avoiding piston jammings than an arrangement in which the bearing 35 is inserted into the guide shank 14.

The working piston 13 is provided with a cylindrical concentric sealing surface 36 for sealing with respect to the steering worm 27, with which cooperates an annular seal 38 mounted on a sealing sleeve 37 (FIG. 1).

The annular seal 38 is arranged at the axially inner sleeve end 39 and has a constant lever arm 41 with respect to the axial outer sleeve end 40. The sleeve end 40 is fixed axially and radially at the wide cylinder section 11 by means of the bearing arrangement 26 and is sealed by means of one annular seal 42 and 43 each with respect to the bearing arrangement 26 and the steering worm 27. Since the outer sleeve end 40 is clamped only along a small surface, the inner sleeve end 39 can carry out slight pivotal movements when the working piston 13 eventually carries out small rotary adjusting movements under load.

For the purposes of economizing structural length, the inner axial bearing 44 of the bearing arrangement 26 is centered at a collar 45 at the outer end 40 of the sealing sleeve 37. This type of construction can be realized shorter in length than when the steering worm 27 itself is provided with a corresponding bearing collar. In order to enable for the working piston 13 to carry out small rotary movements without causing jamming between the piston 13 and steering nut 21 due to the eccentric steering worm bearing support, the steering nut 21 is supported in the working piston 13 exclusively by axial bearings 46 and 47. With this bearing construction, radial adjusting movements of the steering nut 21 with respect to the piston 13 are possible.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What We claim is:

1. A servo-steering mechanism for vehicles in which a steering worm means is operatively spirally movably connected with a working piston means directly in meshing engagement with a steering shaft for the drive connection, characterized in that the steering worm means is eccentrically supported in the working piston means.

2. A servo-steering mechanism with a steering gear housing according to claim 1, characterized in that the inner steering worm end extends through the working piston means and is supported eccentrically in the steering gear housing.

3. A servo-steering mechanism according to claim 2, characterized in that the steering gear housing is subdivided into a section with narrower diameter into a section with wider diameter, the inner steering worm end being eccentrically supported in the narrower section of the steering gear housing.

4. A servo-steering mechanism according to claim 3, characterized in that the steering worm means extends through a concentric sealing sleeve means, and in that the axially outer sealing sleeve end is retained at the steering gear housing and the axially inner sleeve end is provided with an annular seal means cooperating with a cylindrical sealing surface at the working piston means.

5. A servo-steering mechanism according to claim 4, characterized in that the axially outer sleeve end is supported in the wider cylinder section of the steering gear housing.

6. A servo-steering mechanism according to claim 4, characterized in that a bearing means of the steering worm means is centered at the axially outer sleeve end.

7. A servo-steering mechanism according to claim 6, characterized in that a steering nut means on the steering worm means is supported in the working piston means so as to be movable in the radial direction.

8. A servo-steering mechanism according to claim 7, characterized in that the steering nut means is supported in the working piston means exclusively by axial bearings.

9. A servo-steering mechanism according to claim 1, characterized in that the steering worm means extends through a concentric sealing sleeve means, and in that the axially outer sealing sleeve end is retained at a steering gear housing and the axially inner sleeve end is provided with an annular seal means cooperating with a cylindrical sealing surface at the working piston means.

10. A servo-steering mechanism according to claim 9, characterized in that a bearing means of the steering worm means is centered at the axially outer sleeve end.

11. A servo-steering mechanism according to claim 1, characterized in that a steering nut means on the steering worm means is supported in the working piston means so as to be movable in the radial direction.

12. A servo-steering mechanism according to claim 11, characterized in that the steering nut means is supported in the working piston means exclusively by axial bearings.

13. A servo-steering mechanism according to claim 1, characterized in that the working piston means is accommodated within a steering gear housing, and in that the steering worm means extends through a sealing sleeve means, the axially outer end of the sleeve means being retained at the steering gear housing and the axially inner end of the sleeve means being provided with annular seal means cooperating with a substantially cylindrical sealing surface at the working piston means.

14. A servo-steering mechanism which includes a steering worm means operatively connected with a working piston means accommodated within a steering gear housing characterized in that the steering worm means extends through a sealing sleeve means, the axially outer end of the sleeve means being retained at the steering gear housing and the axially inner end of the sleeve means being provided with annular seal means cooperating with a substantially cylindrical sealing surface at the working piston means, and in that a bearing means of the worm means is centered by the axially outer end of the sleeve means.

15. A servo-steering mechanism according to claim 14, with a steering nut means cooperating with the steering worm means, characterized in that the steering nut means is supported in the working piston means so as to be radially movable.

16. A servo-steering mechanism which includes a steering worm means operatively connected with a working piston means accommodated within a steering gear housing, with a steering nut means cooperating with the steering worm means, characterized in that the steering worm means extends through a sealing sleeve means, the axially outer end of the sleeve means being retained at the steering gear housing and the axially inner end of the sleeve means being provided with annular seal means cooperating with a substantially cylindrical sealing surface at the working piston means, and in that the steering nut means is supported in the working piston means so as to be radially movable.

* * * * *